United States Patent

Forster et al.

[11] 4,052,260
[45] Oct. 4, 1977

[54] METHOD OF OPERATING A NUCLEAR-POWER-GENERATING INSTALLATION WITH CLOSED GAS CYCLE AND PLANT OPERATED BY THIS METHOD

[75] Inventors: Siegfried Forster, Alsdorf; Gunter Dibelius, Aachen; Gunter Hewing; Jasbir Singh, both of Julich, all of Germany

[73] Assignee: Kernforschungsanlage Julich GmbH, Julich, Germany

[21] Appl. No.: 694,825

[22] Filed: June 10, 1976

[30] Foreign Application Priority Data

June 12, 1975 Germany .......................... 2526147

[51] Int. Cl.² ............................................. G21C 19/28
[52] U.S. Cl. ........................................ 176/60; 176/65; 60/644; 60/650; 60/682; 60/698
[58] Field of Search .............. 60/644, 650, 682, 698; 176/51, 58–60, 65

[56] References Cited

U.S. PATENT DOCUMENTS

| 3,162,581 | 12/1964 | Brunner | 176/60 |
| 3,748,228 | 7/1973 | Zimmermann | 176/60 |
| 3,929,188 | 12/1975 | Brinkmann et al. | 176/60 |

FOREIGN PATENT DOCUMENTS

| 1,120,817 | 12/1961 | Germany | 60/682 |

*Primary Examiner*—Verlin R. Pendegrass
*Assistant Examiner*—S. A. Cangialosi
*Attorney, Agent, or Firm*—Karl F. Ross

[57] ABSTRACT

A nuclear power-generating installation comprises three power-generating turbines which are operated by three partial gas streams heated in separate passages of a nuclear reactor. After traversing the power-generating turbines the partial gas streams are cooled in respective recuperative heat exchangers to recover residual useful heat therefrom and are combined into a lesser number of gas streams each of which is subjected to at least two compression stages with at least one intervening cooling stage in which all of the gas is combined to flow as a total gas stream through at least one such cooler. Following the last compression stage the gas is again subdivided into three partial streams for preheating in the aforementioned recuperative heat exchangers before traversing the nuclear reactor for the main heating.

20 Claims, 13 Drawing Figures

METHOD OF OPERATING A NUCLEAR-POWER-GENERATING INSTALLATION WITH CLOSED GAS CYCLE AND PLANT OPERATED BY THIS METHOD

FIELD OF THE INVENTION

The present invention relates to a process for operating a nuclear-energy plant with closed working-gas circulation and to a nuclear power plant for carrying out this process.

BACKGROUND OF THE INVENTION

A nuclear power plant operating with a closed working-gas cycle comprises a nuclear reactor serving as the main heating source for a working gas which can then be introduced into a power-generating turbine in which it expands and converts the energy of expansion into useful work in driving the turbine. The latter is connected to an electric-current generator whose output may operate a load, i.e., may be connected to electrical mains supplying the consumer.

Generally residual useful heat of the gas, after it has traversed the power-generating turbine, is recovered in a recuperative heat exchanger which can be used to preheat the gas before it is fed through the nuclear reactor for main heating.

After passing through the recuperative heat exchanger, the gas may be compressed in multiple stages with intervening cooling before being preheated as described in continuation of the closed cycle.

Various systems have been proposed to obtain maximum utilization of the nuclear energy produced by the reactor. For example, in nuclear-energy plants operating with closed working-gas cycles, especially in a nuclear-energy installation in which the working gas is heated in so-called high-temperature reactors, it is known to provide a plurality of closed working-gas cycles in parallel. In such so-called "multiloop" systems it is easier to utilize the total heated gas quantity. However, conventional multiloop systems involve various problems, costs and characteristics, as described below, which have limited the applicability of multiloop principles.

For example, German printed application (Offenlegungsschrift) DT-OS 22 41 426 discloses a nuclear power plant with closed working-gas cycle in which a plurality of parallel flow cross-sections are provided within the reinforced-concrete vessel surrounding the nuclear reactor core and serving to heat or to cool partial gas streams in parallel.

The working gas is then conducted to a turbine set in a separate chamber below the reactor from which the gases flow through separate but parallel heat exchangers to give up residual useful heat.

The disadvantage of this system is that, when it is necessary to repair the turbine set, the entire installation must be brought to a standstill. Also this arrangement provides a low-pressure compressor and a high-pressure compressor on the rotor shaft of the turbine set, whereby making the shaft undesirably long and massive. Finally, the location of the turbine set below the reactor core complicates the gase-feed and gas-discharge ducts at the turbine set. From this results a large necessary space within reinforced concrete so that the capital cost of the installation is relatively high.

A further system has been disclosed in German printed application (Offenlegungsschrift) DT-OS 17 64 249 in which the nuclear power plant has a plurality of gas-circulation loops, each of which is provided with all of the components necessary for the circulation of the gas. Compression of the working gas in each loop is carried out with separate compressors and with intervening cooling in separate coolers.

The advantage obtained by this subdivision of the heated gas flow into several partial streams is at the expense of the disadvantage that long gas paths are required. Furthermore, apart from the energy-producing turbine it is necessary to provide a turbine set comprising a turbine and three compressors for each of the partial gas streams and to provide between each of these compressors, a respective cooler. The capital cost of setting up three such identical loops is thus high and a corresponding gain in overall plant efficiency, as compared with, for example, a single loop system is not always obtained.

OBJECTS OF THE INVENTION

It is an object of this invention to provide a process for operating a nuclear power plant with closed gas cycle whereby the capital cost of the installation can be held relatively low while containing optimum utilization of the space of the plant and a high efficiency of power generation.

Another object of this invention is to provide an improved nuclear power plant of relatively low cost and high efficiency.

SUMMARY OF THE INVENTION

These objects are attained, in accordance with the present invention, by providing a nuclear power-generating system using a closed working-gas cycle in which the working gas is passed through a nuclear reactor to be heated therein subdivided in three partial gas streams and drive respective power-generating turbines. According to the present invention, the partial gas streams are passed through recuperative heat exchangers to abstract residual sensible heat and are then combined into a lesser number of gas streams (e.g., two or one) for passage through a corresponding number of first-stage compressors. At least one additional compressor stage is provided and is traversed by the total gas (all gas streams combined) and at least one intervening cooler is provided ahead of the last compressor stage for traversal by the combined gas.

The term "partial gas stream" is used herein to describe a gas stream which constitutes less than all of the recirculated working gas while the term "combined gas" refers to a combination of all partial gas streams at particular points in the cycle.

According to a first variant of the invention, therefore, the working gas is subdivided into three partial gas streams after traversing the respective power-generating turbines and these partial gas streams are passed through respective recuperative heat exchangers for recovery of residual useful heat therefrom. Thereupon, the gases are combined into a single stream and compressed as a combined gas. The combined gas is thereafter cooled as part of the first stage. Subsequently, in a second stage, the combined gas is compressed again and thereafter cooled. In a third stage the combined gas is compressed in a third compressor and then subdivided into the three partial gas streams for preheating the recuperative heat exchanger, combined during main heating in the nuclear reactor, and again subdivided for expansion in the energy-producing turbines. Thus the working-gas streams are combined and the combined gas is passed through three compressor stages in succession with intervening cooling of the combined gas.

It has been found that this results in a net increase in plant efficiency by comparision to conventional nuclear power plants of the same capital cost. Further, for the same energy output it has a reduced fuel consumption rate and lower operating cost. Since each compressor operates upon a proportionally larger quantity of gas than in earlier multiloop systems, the compressors can have a reduced number of blades of blades, thereby lowering their fabrication cost.

A particular important advantage is that it eliminates the need for three separate intermediate coolers between successive compression stages or coolers with three separate compartments between such compression stages to reduce the cost of the plant and increase its energy efficiency as compared with three-loop prior-art nuclear power plants of the same energy output and the same values of upper and lower working-gas temperature.

According to a second variant of the invention, the three-partial gas streams, after expansion in the energy-generating turbines are passed through respective recuperative heat exchangers and thereafter formed into two partial streams which are respectively precooled and compressed in two compressors of a first stage. The two streams leaving the compressor of the first stage are then subjected to intervening cooling in a single cooler as a combined or total stream. After this intervening cooling, the total stream is compressed in a single second-stage compressor (third compressor) and thereafter subdivided into the three partial streams for preheating in the respective recuperative heat exchangers before being heated as a total stream in the nuclear reactor and after subdividing in three partial streams being fed to the energy-generating turbines.

In this embodiment, therefore, there is a stepwise combination of partial streams before each compression stage and a cooling of the completely combined or total gas stream before the final compression stage.

This permits optimal power generation with respect to the capital and operating costs, as well as effective compression with a lesser number of compressors and intervening coolers than heretofore, even with nuclear power plants operating with a closed gas cycle with electrical power outputs in excess of 1,000 MWe.

A nuclear power plant for carrying out the first variant of the invention comprises a nuclear reactor in a reinforced concrete housing or shell provided with three turbine sets, driving respective electric-power generators, disposed horizontally symmetrically about the axis of the reaction and preferably at the same level therewith.

At least three parallel-connected recuperative heat exchangers, also disposed symmetrically around the shell, preferably in compartments thereof, are supplied with the expanded gas from the respective turbines to abstract residual useful heat therefrom and with respective partial streams of compressed gas to heat the latter.

At least three coolers for the working gas are also symmetrically disposed about the axis of the reactor. The recuperative heat exchangers and coolers are radially distributed around the nuclear reactor core axis and are vertically disposed, each recuperative heat exchanger having a gas line connected to the outlet of the turbine, an outlet for the cooled expanded working gas and, for the compressed gas, an inlet leading from a compressor and an outlet running to the reactor.

The apparatus comprises, according to the invention, downstream of the recuperative heat exchangers and a precooler, a low-pressure (first-stage) compressor whose outlet is connected through an intervening cooler to the intake of an intermediate-pressure (second-stage) compressor. The outlet of the intermediate-pressure compressor is connected through another intervening cooler to the intake of a high-pressure (third-stage) compressor. The outlet of this compressor is connected to the aforementioned parallel inlets of the recuperative heat exchangers.

This system has the advantage of maximum utilization of space and a highly compact installation.

The nuclear power plant as described can have the nuclear-reactor core, the several turbine sets, recuperative heat exchangers and cooler all built into a common reinforced-concrete structure serving as the pressure vessel for the reactor.

Alternatively, the recuperative heat exchangers and coolers can be provided in so-called "satellite" housings of reinforced concrete surrounding the central pressure vessel housing the reactor while the turbine sets can be provided free of reinforced concrete housing structures below the reinforced-concrete housings.

According to a feature of the invention, one of the coolers so situated and constructed can be a precooler for the total working gas (combined gas) ahead of the first-stage compressor. The remaining coolers can then be provided as intervening coolers functioning between compressor stages.

To minimize the total gas-flow path lengths, it is preferred to provide in a circumferential manner and in succession, around the nuclear reactor, next to the turbine set provided with the high-pressure compressor, the precooler and next to this a recuperative heat exchanger. Adjacent the turbine set with the low-pressure compressor, there is provided the first intervening cooler and next to this a second recuperative heat exchanger. Adjacent the turbine set with the intermediate-pressure compressor, the second intervening cooler is disposed and adjacent this the third recuperative heat exchanger.

An effective usage of the space of the reinforced-concrete pressure vessel is achieved by providing the gas duct for the expanded working gas from the recuperative heat exchanger to the precooler above the heat exchanger and above the precooler in the reinforced concrete vessel. The working gas spaces above the heat exchanger and cooler are connected together and the heat exchanger and cooler are disposed peripherally around the nuclear reactor such that the precooler is disposed adjacent the turbine set with the high-pressure compressor, adjacent the precooler one of the recuperative heat exchangers is disposed and adjacent the turbine set with the low-pressure compressor, the first and second intervening coolers are disposed. Adjacent the turbine set with the intermediate-pressure compressor, the remaining two recuperative heat exchangers are located. In this configuration of the nuclear power plant it is possible to eliminate the hitherto required feedback path for the working gases after traversing the heat exchangers and generally extending through the lower portions of the reinforced concrete vessel. This arrangement has the additional advantage that it makes available more space for the recuperative heat exchangers in the reinforced-concrete housing, thereby allowing the flow cross sections of the latter and the heat exchange achieved thereby to be increased.

According to another feature of the invention, particularly directed to the first variant thereof, the recesses or compartments formed in the reinforced concrete housing of the nuclear reactor for the recuperative heat exchangers is provided below the recuperative heat exchanger with a precooler. In this case, the working gases exiting from the recuperative heat exchangers can pass directly through respective precoolers in three parallel partial streams. The working gas is then combined to form the total gas stream (combined gas) only after traversing the individual precoolers. By comparison with prior-art nuclear power plants having three loops, this eliminates separate compartment which has hitherto been required for the coolers and thereby increases the size of the nuclear reactor plant which can be provided in a given space or the fabrication cost of the plant. Relatively short gas lines and paths can be attained in this arrangement by providing peripherally around the axis of the nuclear reactor next to the turbine set with the highpressure compressor, two of the recuperative heat exchangers with respective precoolers and next to the turbine set with the low-pressure compressor the first intervening cooler and next to the latter a further recuperative heat exchanger with its precooler in a common compartment. Next to the turbine set of the intermediate-pressure compressor, the second intervening cooler is disposed.

A nuclear power plant for carrying out the process of the second variant of the invention generally comprises a reinforced concrete pressure vessel for the nuclear reactor core, three horizontally disposed turbine sets located symmetrically about the nuclear reactor and driving respective generators, at least three parallel-connected reuperative heat exchangers traversed by the expanded and compressed working gas, and at least three coolers for the working gas. The recuperative heat exchangers and coolers are distributed radially about the nuclear reactor axis and are vertically disposed. The recuperative heat exchangers for the expanded working gas are such provided with a connection to the gas outlet of the turbines as well as a gas outlet for the cooled expanded working gas, an inlet for feeding the compressed working gas to each of the recuperators and an outlet from the latter recuperators running to the nuclear reactor.

The nuclear power plant according to the second variant of the invention is provided with duct means whereby the working gases after expansion and passage through the recuperative heat exchangers and a precooling arrangement, are passed in two partial streams through two of the compressors (operating as low-pressure compressors) and are combined at the gas-outlet of the low-pressure compressors to feed a common intervening cooler. The duct means also connects the outlet of the intervening cooler with the inlet of the third compressor. The latter constitutes a high-pressure compressor from whose gas outlet three lines run to the parallel-connected recuperative heat exchangers.

It has been found to be advantageous, in this arrangement, for the turbine sets provided with the low-pressure compressors to drive respective generators while the high-pressure compressor turbine set drives no generators. In this case the turbine set of the high-pressure compressor need not be driven at the synchronous speed required by the electrical-network (mains) frequency and thus can be operated optimally independently of the speed required for driving a generator at synchronous rate. The high-pressure compressor can thus be permitted to overspeed without causing problems.

The nuclear power plant according to the second variant of the invention can be provided, as described above, with a common reinforced concrete housing for the nuclear reactor, turbine sets, recuperative heat exchangers and coolers or with satellite housings for the recuperative heat exchangers and coolers and turbine sets disposed freely beneath the reinforced concrete housing for the nuclear reactor.

In this variant of the invention, the three coolers are used economically in that two of the coolers are connected in parallel for the two partial streams of gas as precoolers while the third forms a total-gas cooler as the intermediate cooler between the two compressive stages.

In the embodiment the components are spaced peripherally around the reactor such that, next to the turbine set of the high-pressure compressor, the intermediate cooler is disposed and next to the intermediate cooler one of the recuperative heat exchangers is located. Thereafter, continuing around the periphery of the reactor, next to one of the turbine sets for a low-pressure compressor there is disposed one of the precoolers and a further recuperative heat exchanger. An especially space-saving configuration has each of the compartments for a recuperative heat exchanger in the reinforced concrete pressure vessel of the nuclear reactor, provided also disposed one of the precoolers. In this case the working gas flows through the precooler directly after leaving the recuperative heat exchanger and flowing into the latter in two partial gas streams formed from the three original partial gas streams.

In all of the nuclear power plants for carrying out both of the variants of the invention, the intermediate coolers or precoolers traversed by the total stream (combined stream) of the working gas are so constructed and arranged that each constitutes two parallel-connected throughflow intervening cooler or precooler units disposed one beneath the other in the respective compartments of the reinforced concrete vessel such that the gas outlet side of one unit lies opposite the gas inlet side of the other unit. With this arrangement of two parallel operating units per cooler the gas streams flow through the units in the same direction so that the gas feed between the compressors and the intervening coolers or between the recuperative heat exchangers and the precoolers can be located on only one side of the recesses or compartments. This greatly simplifies gas supply to the coolers and minimizes the lengths of the gas paths.

The gas-carrying ducts of the high-pressure working gas are so arranged that they extend vertically upwardly from the gas outlet of the high-pressure compressor while the gas ducts feeding the turbine sets of the low-pressure and intermediate-pressure compressors first run to them and only then extend vertically upwardly.

According to another features of the invention, the shafts between the respective turbines and the low-pressure compressor or the intermediate-pressure compressor of the respective turbine sets extend through housing structures separating the turbine inlet compartment from the compressor outlet compartment and provide it with labyrinth seals whereby the compartments surrounding the turbine inlets are connected with the gas outlet of the high-pressure compressor duct.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
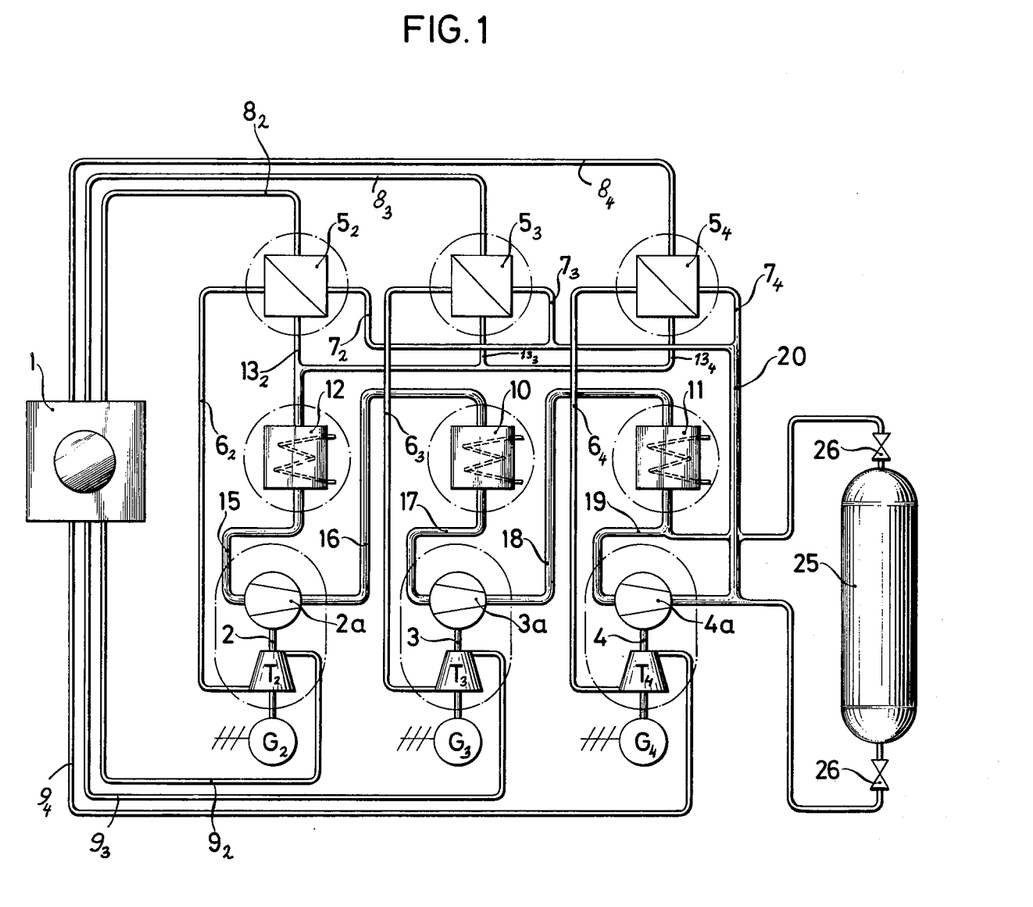
FIG. 1 is a flow diagram of a nuclear power plant operating with a closed gas cycle according to a first circuit arrangement.
Figure 2:
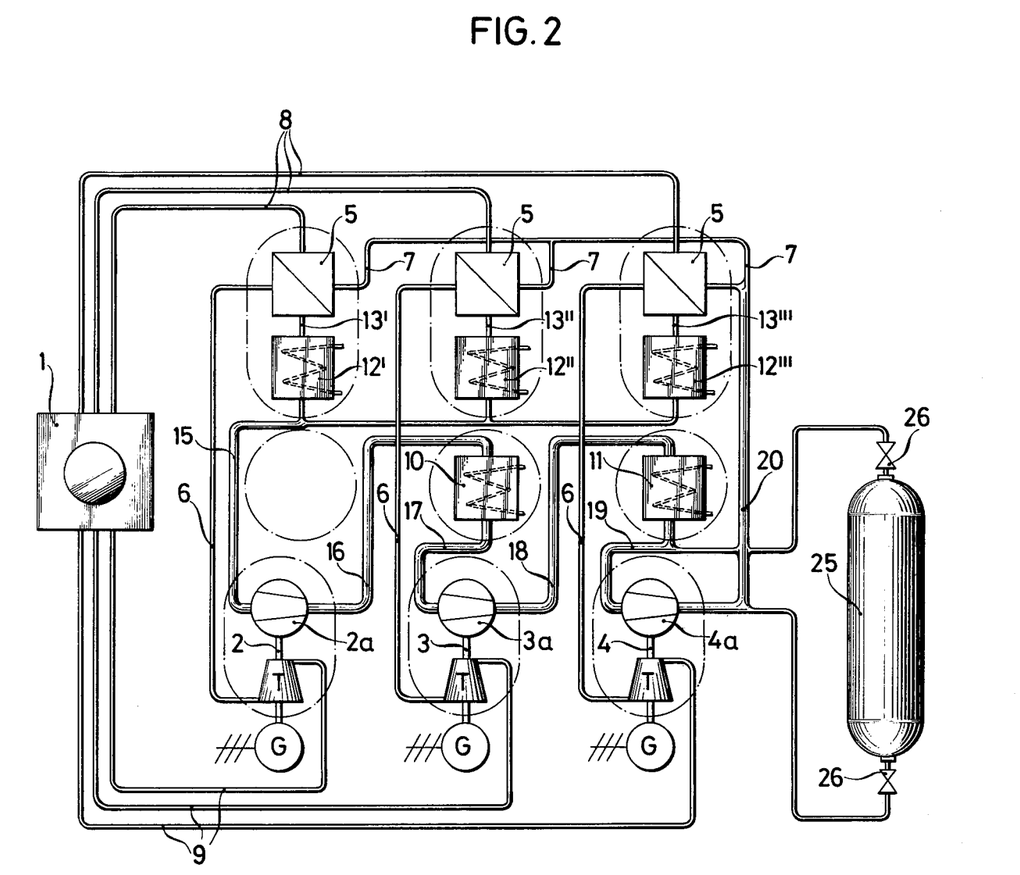
FIG. 2 is a flow diagram of a power plant operating with a closed gas cycle according to a second arrangement.
Figure 3:
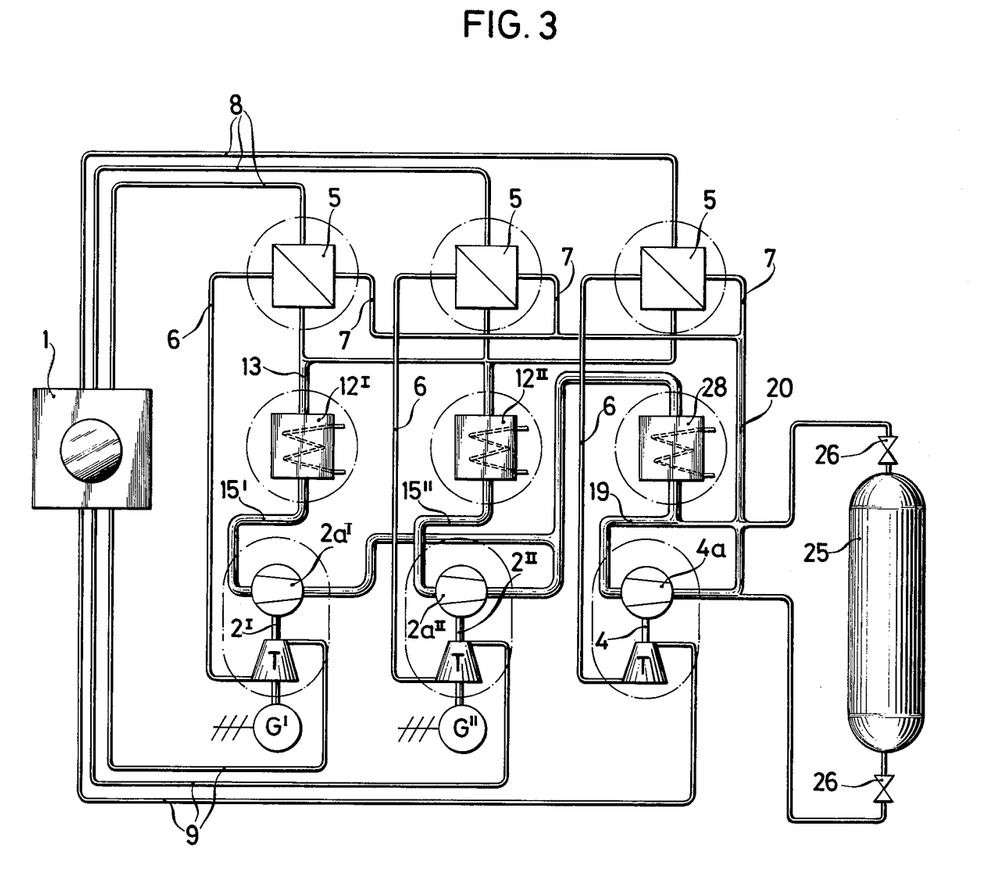
FIG. 3 is a flow diagram of a power plant operating with a closed gas cycle according to a third circuit arrangement.

The gas circuits illustrated in the drawing represent three different embodiments, respectively illustrated, in FIGS. 1 through 3, the first and second circuit connections of FIGS. 1 and 2 corresponding to the first variant of the invention while the other circuit (FIG. 3) corresponds to the second variant as previously described. The nuclear power plant shown in the subsequent Figures represents particular configurations of the structures associated with these circuits. To clarify the relationship between several embodiments and circuits, the first circuit is designated 1 and the associated power plant configurations respectively with 1-1, 1-2 and 1-3. The embodiments for circuit 2 are designated 2-1 and 2-2 and the single embodiment with the circuit 3 is designated 3-1.

In all embodiments, around the nuclear reactor 1 there are disposed three horizontal turbine sets 2-4. In the flow direction of the working gas, the latter passes through the three turbines $T_2$, $T_3$ and $T_4$ of the turbine sets 2-4 and then through respective recuperative heat exchangers $5_2$, $5_3$ and $5_4$.

From the nuclear reactor 1 respectively lines $9_2$, $9_3$ and $9_4$ deliver hot compressed gases to the respective turbines $T_2$, $T_3$ and $T_4$ in respective partial streams, the turbine sets driving respective generators $G_2$, $G_3$ and $G_4$ respectively. From the turbines $T_2$-$T_4$ the hot gases pass in respective partial stream via lines $6_2$-$6_4$ to the respective sections of the recuperative heat exchangers $5_2$-$5_4$. Residual useful heat is removed in these recuperators. The gases emerging at $13_2$, $13_3$ and $13_4$ from these recuperators are combined into a line 13 carrying the entire gas flow (combined or total gas) in a precooler 12, whereupon the combined gas flows via line 15 through a low pressure compressor 2a driven by the turbine $T_2$ and forming part of the turbine set 2.

Line 16 carries the compressed combined stream from this first or low-pressure stage compression to an intervening cooler 10 from which the cold gas flows via line 17 to the intermediate-pressure, second-stage compressor 3a forming part of the turbine set 3 and driven by the turbine $T_3$. A line 18 carries the warm compressed gas to another intervening cooler 11 from which the gas flows via line 19 through the high-pressure third-stage compressor 4a. The latter forms parts of the turbine set 4 and is driven by the turbine $T_4$.

The combined gas is then distributed by line 20 to three partial streams $7_2$, $7_3$ and $7_4$ which respectively traverse the recuperative heat exchangers $5_2$, $5_3$ and $5_4$ before being passed via lines $8_2$, $8_3$ and $8_4$ to the nuclear reactor 1.

To allow for variations in power demand, a compressed gas storage vessel 25 can be connected across the high-pressure compressor via valves 26, the assembly 25, 26 forming a frequency-regulating storage system.

Thus in accordance with the first variant of the method of the invention and as illustrated in the system of FIG. 1, the gas streams are combined at 13 after abstraction of useful heat in the recuperators $5_2$-$5_4$ which are individual to the partial streams, are subjected to precooling, compression and intervening cooling in a combined gas stream and are again subdivided into the three partial gas streams at the final compressor 4a before being again passed through the recuperators for preheating before being fed to the reactor.

In the circuits 1 and 2, corresponding to FIGS. 1 and 2, the first turbine set 2 is provided with a low-pressure compressor 2a, the second turbine set 3 is provided with an intermediate-pressure compressor 3a and the third turbine set 4 with a high-pressure compressor 4a. The working gas before each compression step is cooled in the intervening coolers 10, 11.

In the circuit 1, according to the embodiments 1-2 to the gases always pass through the precooler 12 as a combined or total gas stream, before entering the low pressure compresorr 2a.

In the circuit of embodiments 2-1 and 2-2, illustrated in FIG. 2, for example, three precoolers 12', 12" and 21'" are provided (see also FIGS. 7 and 8) in the compartments formed in the reinforced concrete vessel 14 for the nuclear reactor in which the recuperative heat exchangers, here designated collectively by the numeral 5, are disposed. In each of these compartments the precoolers 12', 12", 12'" are disposed below the respective recuperative heat exchangers 5.

The precoolers 12', 12' and 12'" are supplied with the working gas via lines 13', 13" and 13'"and after passing through the precoolers, the partial streams are combined at line 15 to flow through the low pressure compressor 2a as the combined or total stream.

Figure 4:
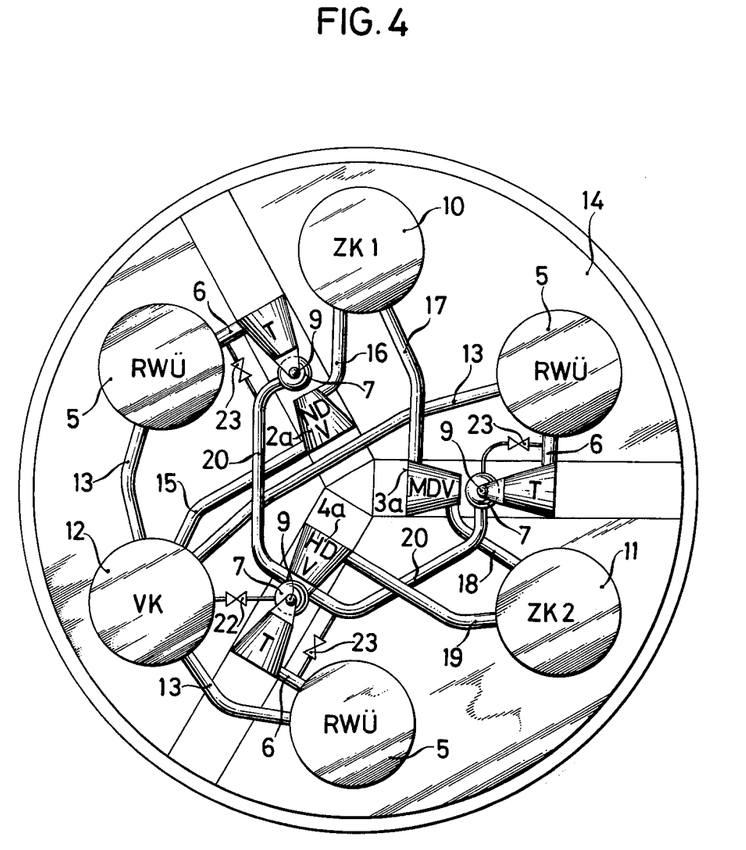
FIG. 4 is a plan view, in diagrammatic form, of a reinforced concrete pressure vessel for a nuclear power plant, the nuclear reactor core being omitted, showing the connections for the first circuit arrangement.

In FIG. 4 we have shown an embodiment 1-1 of the invention utilizing the flow diagram of FIG. 1. In this nuclear power plant all of the components of the working-gas cycle are provided in a common reinforced concrete vessel 14 containing the nuclear reactor core (not shown). The components are so disposed as to minimize the gas-flow paths and, therefore, the length of the gas ducts and connecting fittings. The components, as in the embodiments of FIGS. 5 - 9, are disposed peripherally around the axis of the nuclear reactor which is perpendicular to the plane of the paper in FIGS. 4 - 9.

In the system of FIG. 4, next to the turbine set 4 with the high-pressure compressor 4a, there is provided the precooler 12 and thereafter one of the recuperative heat exchangers 5. Next to the turbine set 2 of the low-pressure compressor 2, there is provided the intermediate cooler 10 and next to this a further recuperative heat exchanger 5.

Adjacent the turbine set 3 with the intermediate pressure compressor 3a we provide the second intervening cooler 11 and the third recuperative heat exchanger 5.

In the embodiments of FIGS. 4 - 9, the recuperative heat exchangers have been identified as RWU, the intermediate coolers as ZK1, ZK2, etc. and the precooler as VK. The turbines are designated as T while the compressors are generally represented at V, the low-pressure compressors as NDV, the intermediate-pressure compressors as MDV and the high-pressure compressors as HDV.

Figure 5:
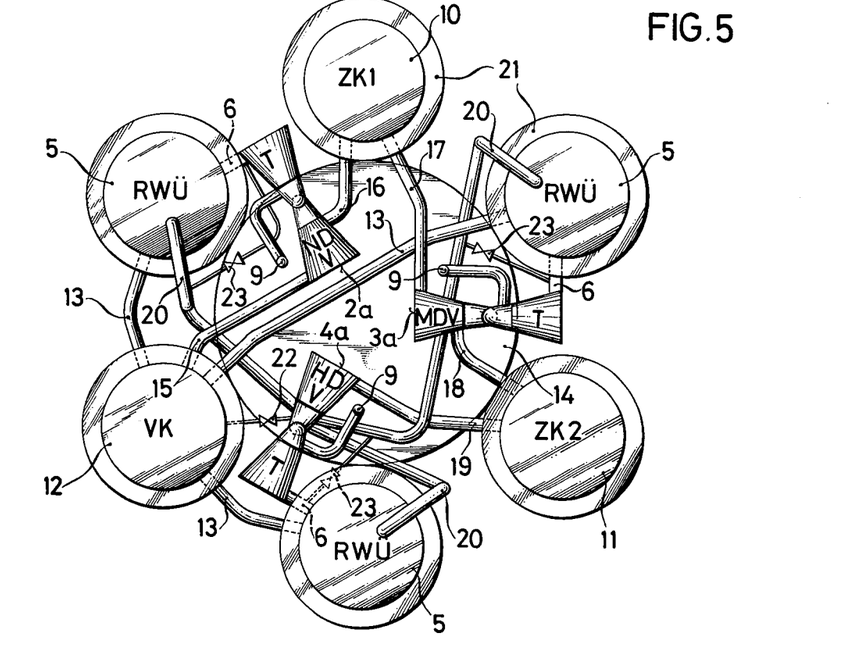
FIG. 5 is a diagrammatic plan view of the reinforced concrete reactor vessel, again without the nuclear reactor, showing the power plant with connections according to the second circuit arrangement.

The same disposition of these gas-circulation components in a peripheral sense can be found in FIG. 5 for the nuclear power plant in which the recuperative heat exchangers 5, the precooler 12 and the intermediate coolers 10 and 11 are provided in so-called satellite housing 21. In this arrangement the turbine sets 2-4 are disposed in free-standing relationship beneath the reinforced concrete vessel 14 for the nuclear reactor core. The gas ducts and fixers between the individual components are also free ducts in the sens that they need not be embedded or provided in the reinforced concrete of the vessel 14.

The reactor vessel of in FIGS. 4 and 5 is of the type generally provided for the heating of the gas in three-loop circulations. In both of these embodiments the number and arrangement of the recesses or chambers for receiving the gas-circulation components is the same and the components are provided in the same number as may be used for a conventional three-loop arrangement and the connections to the reactor are the same. However, utilizing the principles of the first variant of the invention, the system is far more compact and efficient for the reasons noted earlier.

Figure 6:
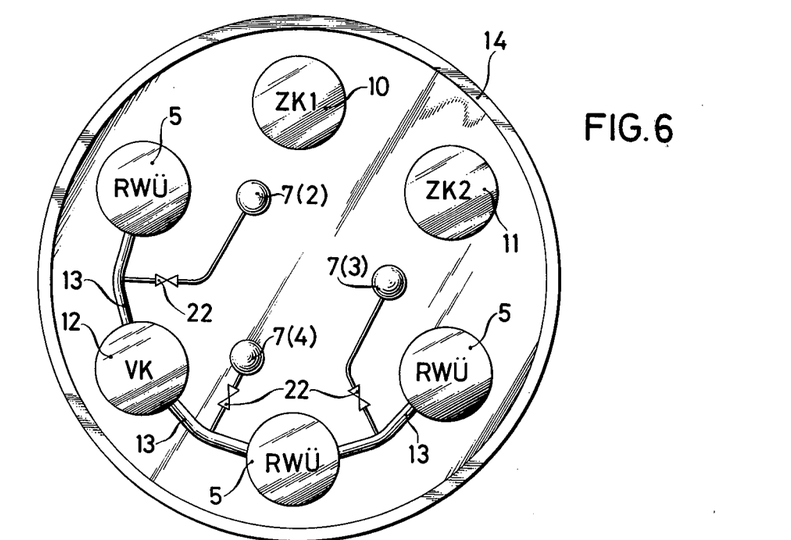
FIG. 6 is a diagrammatic plan view of the reinforced concrete vessel of a nuclear power plant provided in its upper part with gas lines for the expanded working gas between the recuperative heat exchanger and precooler, the system being used in the circuit of the third embodiment.

Another embodiment 1-3 of the invention, utilizing the flow diagram of FIG. 1, is schematically illustrated in FIG. 6. In this nuclear power plant the gas duct 13 between the recuperative heat exchanger 5 and the precooler 12 is inset in the upper of the reinforced concrete vessel 14. The gas duct 13 communicates between the gas chambers provided above the recuperative heat exchangers 5 and formed in the recesses or chambers of the vessel 14 in which these recuperative heat exchangers are disposed. Duct 13 also communicates with the gas space above the precooler 12 in its recess or chamber.

In this embodiment it is advantageous to arrange the peripherally disposed components so that two of the recuperative heat exchangers 5 are directly neighboring. In the embodiment 1-3 in FIG. 6, therefore, in the clockwise sense there is the following succession of gas-circulation components:

turbine set 4 (of which only the vertically extending line 7 is shown),
precooler 12,
one of the recuperative heat exchangers 5,
turbine set 2 (of which only its discharge duct 7 is illustrated),
the first intervening cooler 10,
the second intervening cooler 11,
turbine set 3 (of which only its vertical outlet 7 is seen), and
two further recuperative heat exchangers 5.

In FIG. 6 the configuration of the reinforced concrete vessel 14 and the disposition of the component have been shown extremely diagrammatically. In addition to the elements described, bypass ducts 22 are provided to connect the high-pressure gas lines 7 with the gas ducts 13. The bypass lines 22 served, as alluded to earlier, to provide gas required for start-up and close-down of the plant as well as compensation for changes in power demand and for shunting the gases when the turbine sets deliver no power to the generators G. Such bypass ducts are provided in the embodiments 1-1 and 1-2 (see FIGS. 4 and 5) as well.

The valved bypass lines 23 in these embodiments provide a connection between the high-pressure compressed gas line 20 and the gas line 6 which supplies the expanded gas from the turbine to the recuperative heat exchangers 5. In addition, the high-pressure and low-pressure sides of the compressors of the turbine sets 2 and 3 are shunted by valved bypass lines 24. The bypass lines 22 and 24 can be located at the low portions of the reinforced concrete structure on the turbine sets disposed therebelow.

To facilitate adjustment for changes in power demand, the invention provides the aforementioned frequency-control gas-storage system 25 which is connected via closable valves 26 with the gas outlet of the high-pressure compressor 4a and its line 20 and with the inlet line 19 of this compressor. The frequency-control gas-storage system 25 can also be effectively provided in the embodiments 2-1, 2-2 and 3-1 as diagrammatically apparent from FIGS. 2 and 3.

Figure 7:
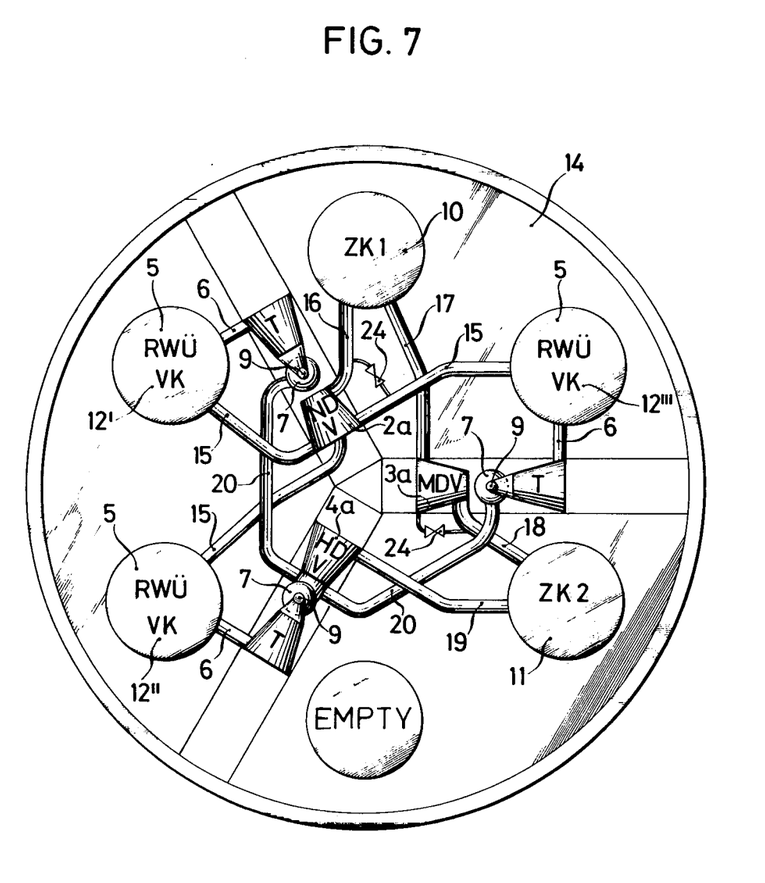
FIGS. 7 through 9 are diagrammatic plan views of other embodiments of the reinforced concrete reactor vessel, the embodiment of FIG. 8 having satellite vessels, with the nuclear reactor omitted, illustrating other embodiments of the invention.
Figure 8:
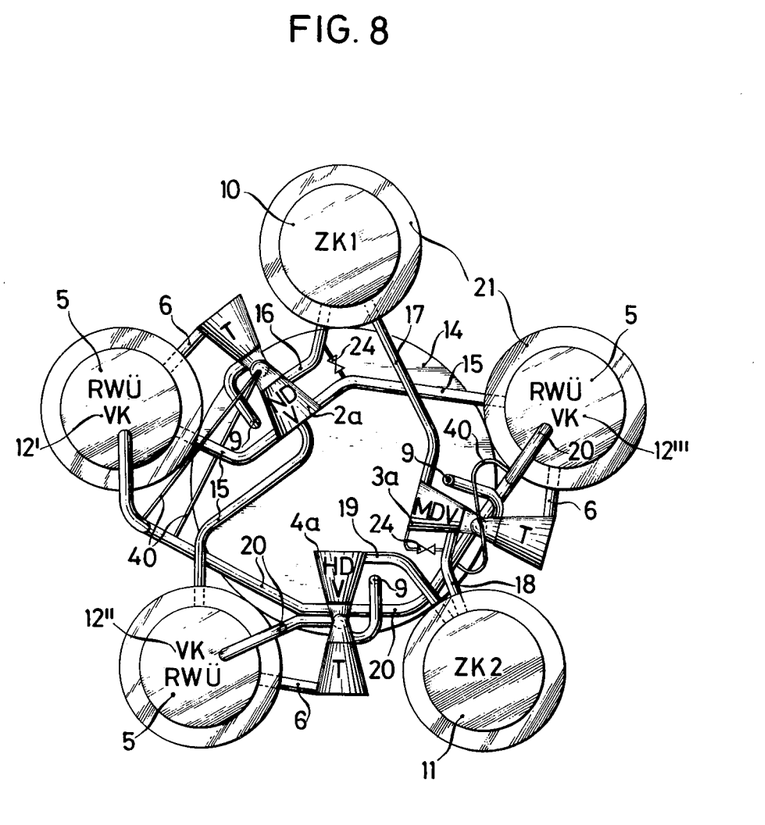

The constructions of the nuclear power plants of the embodiments 2-1 and 2-2, the flow diagrams of which have been illustrated in FIG. 2, can be seen from FIGS. 7 and 8. In the embodiment 2-1 of FIG. 7, the nuclear power plant has all of the components of the gas cycle received in the reinforced concrete housing 14 for the nuclear reactor. In the embodiment 2-2 of FIG. 8, however, satellite housing 21, as in the case of the embodiment 1-2 of FIG. 5, are provided for the recuperative heat exchangers 5 with precoolers 12, 12'' and 12''' and for the intervening coolers 10 and 11.

In the embodiments 2-1 and 2-2, the working gas after traversing the precoolers 12', 12'' and 12''' and the gas line 15 are collected at the low-pressure compressor 2a of the turbine set 2.

This second embodiment of the invention has the advantage that, when the reinforced concrete housing 14 is formed to accommodate three loops for the nuclear power plant, one of the compartments can remain empty. In this compartment other components of the nuclear power plant can be provided, so that additional space for them is not necessary.

In the satellite-housing version (FIG. 8) of the second embodiment it has been found that an optimally short flow path for the gas is provided if the components are distributed around the nuclear reactor in a clockwise sense such that after the turbine set 4 with a high-pressure compressor 4a, the recuperative heat exchangers 5 are disposed in succession, each being associated in three respective compartments with one of the precoolers 12', 12". The turbine set 2 with the low-pressure compressor 2a, is followed by the first intervening cooler 10 and the third recuperative heat exchanger 5 in whose compartment the third precooler 12''' is disposed. The lastmentioned heat exchanger is followed by the turbine set 3 with the intermediate pressure compressor 3a and the second intervening cooler 11.

It has been found to be advantageous to form the recuperative heat exchangers 5 and the associated precoolers 12', 12" 12''' as vertical structures which are traversed by the expanded working gas downwardly. The gas lines 6 are then provided as risers and open in the gas compartment above the recuperative heat exchangers 5.

In the embodiment 2-1 and 2-2, as described in connection with FIGS. 4 through 6, valved bypass lines 22 through 24 are provided to control the gas flow for variation in power demand and other conditions as described. To this end, valve bypass 22', 22" and 22''' are provided between the gas duct 7 and the lines 13', 13", 13''' running to the precoolers 12', 12", 12'''. These bypasses are preferably provided at an upper portion of the reinforced concrete having 14 or above the latter.

Figure 9:
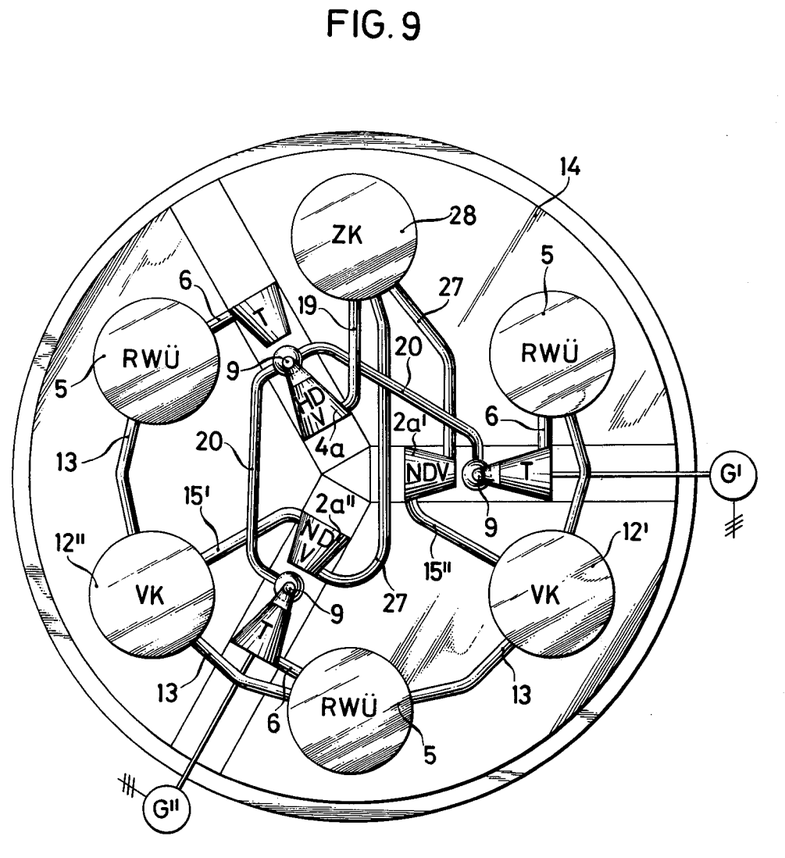

In FIG. 9 we have shown the disposition of the components of the nuclear power plant utilizing the gas circuit of FIG. 3 and constituting the embodiment 3-1. The assembly can be built into the reinforced concrete reactor housing 14 and comprises two turbine sets 2' and 2", each having a low-pressure compressor 2a and 2a", and respective precoolers 12' and 12". The expanded gas is passed as shown in the circuit of FIG. 3, after traversing the respective recuperative heat exchangers 5 into two parallel partial streams and precooling in the precoolers 12' and 12" and thence into the low-pressure compressors 2a and 2a". Before the second compression stage in the high-pressure compressor 4a of the turbine set 4, the partial gas streams are combined from the outlets of the low-pressure compressors 2' and 2" via a gas line 27 and are passed into the intervening cooler 28. From the intervening cooler 28 the working gas flows via line 19 to the high-pressure compressor 4a.

According to the invention, only the turbine sets provided with the low-pressure compressors 2a' and 2a", i.e. the sets 2' and 2", are formed with generators G' and G" which can have identical outputs. The turbine set 4 with the high-pressure compressor 4a is not provided with any generator. The energy produced by the turbine of this set is used to operate the high-pressure compressors. Of course, a low power-demand generator may also be connected to the set 4.

A preferred disposition of the components in the embodiment 3-1 of FIGS. 3 and 9, in the clockwise sense around the nuclear reactor axis is a turbine set 4 with the high-pressure compressor 4a, intervening cooler 28, a first recuperative heat exchanger 5, the second turbine set 2" with one low-pressure compressor 2a", the second precooler 12" and the third recuperative heat exchanger 5.

Although a corresponding arrangement in which the heat exchangers, precoolers and intervening coolers are disposed in satellite housing has not been illustrated, it will be apparent that such an arrangement is also possible for this flow circuit as well.

Figure 10:
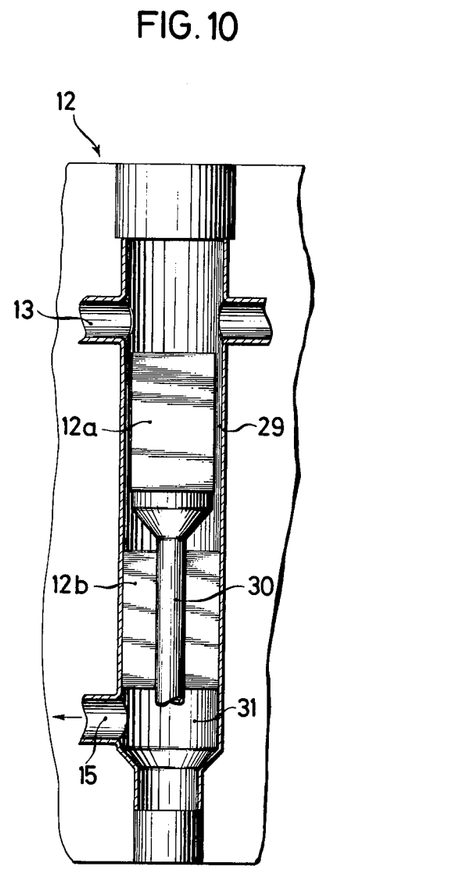
FIG. 10 is a diagrammatic section illustrating two parallel-connected precooler units disposed one below the other in a compartment of the reinforced concrete reactor vessel.
Figure 11:
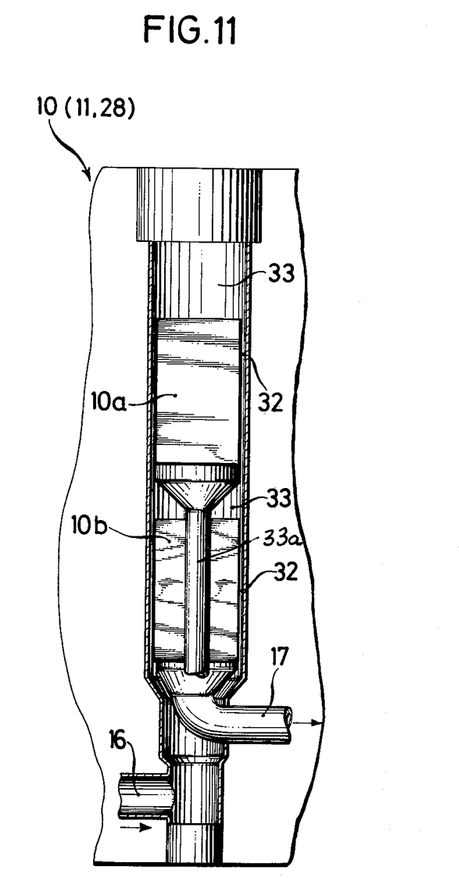
FIG. 11 is a similar view of two parallel-connected intermediate coolers according to the invention arranged one below the other.

Each of the precoolers 12 or the intervening coolers 10 or 11 which are traversed by the total gas stream (combined gas) and the precoolers 12' and 12" are advantageously provided in the respective compartments of the reinforced concrete housing as to parallel-connected units disposed one behind the other such that the gas outlet side of one unit lies opposite the gas inlet side of the other (FIGS. 10 and 11). FIG. 10 shows schematically a precooler 12 according to the embodiment 1-3, the working gas being introduced from the above via the duct 13. The precooler comprises two precooler units 12a and 12b which are traversed by the working gas in the same direction, i.e., downwardly.

The upper precooler unit 12a is centrally disposed in the compartment formed in the reinforced concrete structure so that between its outer wall and the inner wall of the recess a clearance 29 is provided as a passage for a portion of the working gas to be cooled in unit 12b. The precooling unit 12b has a central coaxial gas duct 30 through which the cooled gases of the first unit 12a can pass to open into a compartment 31 beneath the lower cooler 12b. In this compartment 31, the gases which traverse the lower cooler 12b, after passing through the clearance 29 around the upper cooler 12a are combined with the gases which have been cooled in the unit 12a and are carried through the duct 30. The design of the precoolers is such that the mass flow in both units 12a and 12b is nearly the same.

In a manner similar to that which has been shown in FIG. 10, an intermediate cooler 10 can have the configuration shown in FIG. 11. Here the intervening cooler comprises two parallel-connected intervening cooler units 10a and 10b disposed one beneath the other so that the gas outlet side of one of these units lies opposite the gas inlet side of the other, so that the working gas passes in the same direction of flow through both. Between the wall units and the wall of the recess in the structure 14 in which they are disposed there is provided a clearance 32 so that the gases entering from duct 16 at the bottom pass upwardly around the lower units 10b and then into the latter to flow downwardly and emerge at the duct 17. Another portion of these gases passes upwardly around the unit 10a to flow downwardly through the latter and through a central duct 33a into the same outlet 17 flowing to the intermediate-pressure compressor 3b. The inlet sides of the two units are represented at 33. The intermediate coolers 11 and 28 can of course be similarly constructed.

Figure 12:
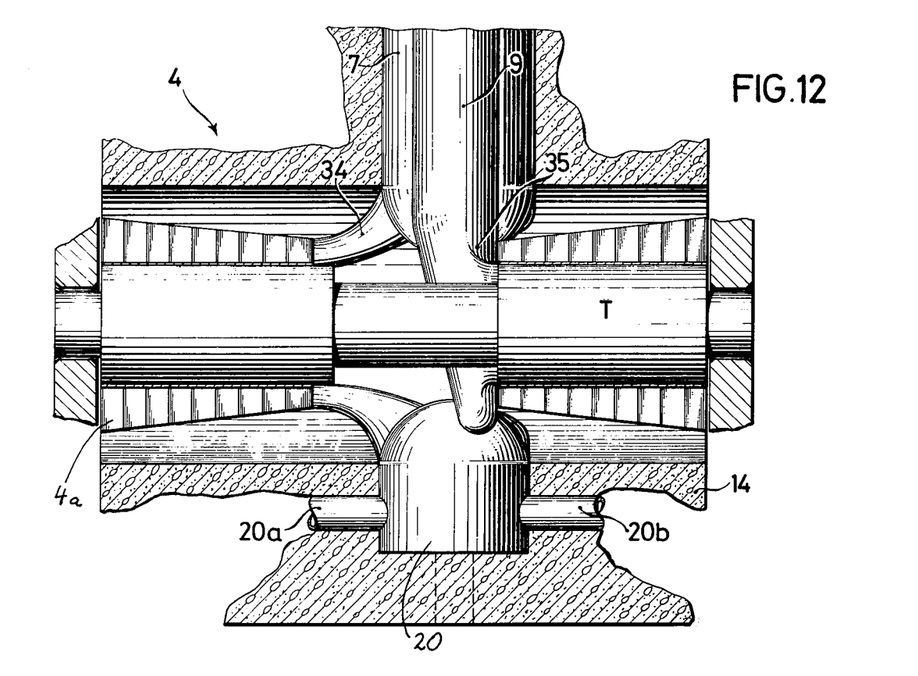
FIGS. 12 and 13 are diagrammatic axial sections of turbine sets respectively having a high-pressure compressor and a low-pressure compressor.
Figure 13:
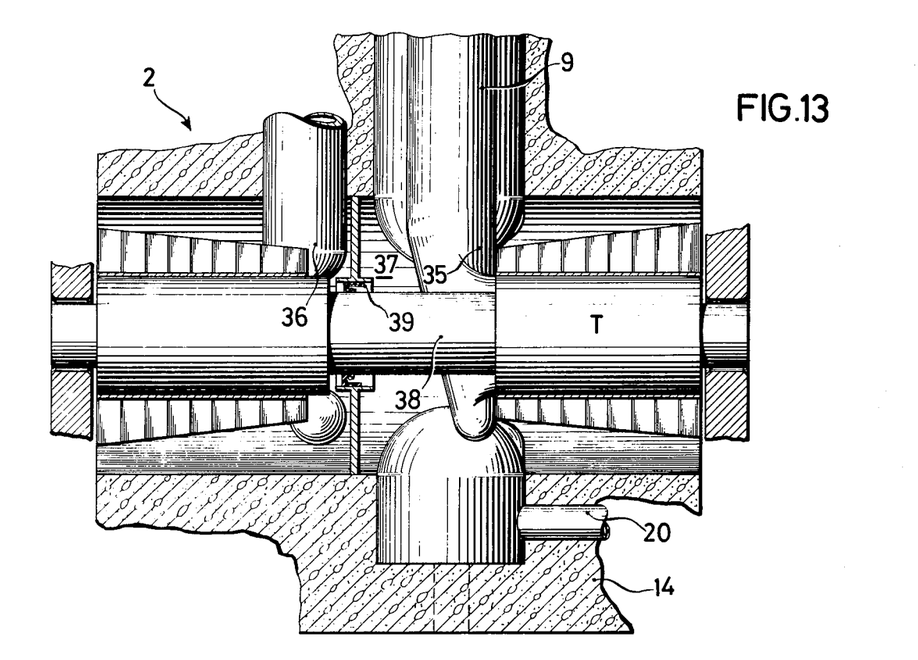

A particularly advantageous construction of the turbine sets 4 and 2, with the respective high-pressure compressor and low-pressure compressor, is illustrated in FIGS. 12 and 13. The turbine set 3 with its intermediate-pressure compressor 3a can have a construction similar to that shown in FIG. 13.

In the gas outlet 34 of the high-pressure compressor 4a (FIG. 12), a branching of the flow at duct 20 is effected into the lines 20a and 20b. A third of the working gas flows directly upwardly from the outlet 34 into one line 7 which is formed as a riser to the recuperative heat exchangers or exchanger 5. The remainder of the gas is fed through horizontally extending gas lines 20a and 20b formed in the reinforced concrete housing 14 respectively to the turbine sets 2 and 3 and thence upwardly. The highly compressed gas is here advantageously used to seal the turbine inlet 35 with respect to the compressor outlet 36 (see FIG. 13).

Through the gas lines 20a and 20b highly compressed working gas is fed to the space 37 surrounding the turbine inlet 35 and flows from this compartment into the line 7 connected to one of the recuperative heat exchangers. As a sealing element between the space 37 and the space surrounding the compressor outlet 36, we provide a labyrinth seal 39 around the shaft 38. A similar arrangement can be provided for sealing the turbine sets 2 through 4 when the latter lie outside the reinforced concrete housing. In this case as can be seen from FIG. 8 tielines 40 are provided to bleed highly compressed working gas from lines 20 to the spaces surrounding the turbine inlets which can in addition be sealed relative to the respective compressor outlets by labyrinth seals as shown in FIG. 13. In the shafts of the structure in which the lines 7 are disposed, we also provide the gas ducts 9 (see FIGS. 12 and 13), preferably coaxially to insulate the walls from the high temperature gases of lines 9.

In all embodiments according to the invention, there is a gathering of the partial streams of the working gases after they have traversed the recuperative heat exchangers and a multistep compression of the working gases with intervening cooling. By comparison with earlier systems involving multistep compression in multiloop cycles, there is a material improvement in the thermodynamic characteristics of the power plant even when corresponding numbers and sizes of gas circulating components were used. With the system of the invention, however, the gases traverse shorter paths and an overall saving in capital cost and better utilization of energy is obtained. More effective start-up conditions and rapid adjustment to changes in power demand are obtained through the use of the aforedescribed bypasses and pressure accumulators. The particular construction of the coolers as two-unit arrangements has been found to allow large working gas volumes to be processed with considerable economy of space. The construction of the entire system is simple.

We claim:
1. A method of operating a nuclear power plant with a closed-gas cycle which comprises the steps of:
   a. heating a working gas in a total stream in a nuclear reactor and subdividing the total stream after heating into three parallel partial streams;
   b. extending each of said gas streams in a respective turbine of a respective turbine set to drive a respective compressor thereof;
   c. abstracting useful heat from each of the partial gas streams expanded in the respective turbines in a respective recuperative heat exchanger;
   d. precooling the gas of said partial gas streams;
   e. combining the gas of said partial gas streams into a lesser number of gas streams and compressing same in at least two successive stages in said compressors with at least the compressor of the last of said stages compressing all of the combined gas of said streams;
   f. cooling the gas between said stages in at least one intervening cooler traversed by the combined gas of said partial gas streams;
   g. subdividing the combined gas from the last of said stages into three partial streams;
   h. preheating said partial streams upon subdivision in step (g) in said recuperative heat exchangers; and
   i. feeding the preheated partial gas streams to said nuclear reactor for heating therein in step (a); and
   j. driving electrical generators with the turbines of at least two of said sets.

2. The method defined in claim 1 wherein the partial gas streams are combined after step (c) and are precooled in step (d) as the combined gas, the precooled gas of step (d) being then passed in succession through each of said compressors and being cooled with said intervening coolers in step (f) after passing through the first and second of said compressors.

3. The method defined in claim 1 wherein said partial gas streams are precooled in step (d) in respective precoolers and are thereafter combined into a single gas stream, said single gas stream being passed in succession through all of said compressors and being cooled after the first and second compressors in respective intervening coolers.

4. The method defined in claim 1 wherein said partial gas streams subsequent to step (c) are combined into two further partial gas streams, each of said further partial gas streams being cooled in a respective precooler, said further partial gas streams being individually compressed in two of said compressors and combined thereafter to form a single gas stream passing through said intervening cooler.

5. A nuclear power plant comprising:
   a nuclear reactor provided with a reinforced concrete housing;
   three turbine sets angularly equispaced around the axis of said reactor and each provided with a turbine and a compressor coupled with said turbine;
   at least two electrical generators respectively connected to at least two of said sets and driven by the expansion of hot gas in the respective turbines;
   respective recuperative heat exchanger units distributed around the axis of said reactor and traversed by said partial streams for preheating same prior to passage through said reactor;
   duct means connecting each of said turbines with a respective one of said recuperative heat exchangers for abstracting residual heat from expanded gas discharged from the respective turbine;
   at least two coolers distributed around the axis of said reactor;
   second duct means for passing gas from said recuperative heat exchangers through at least two of said compressors in succession and through at least one of said coolers serving as an intervening cooler between the successive compressors;
   means for combining said partial gas streams so that the total circulated gas traverse said intervening cooler and the last compressor of said succession; and
   means for subdividing the total gas traversing said last compressor into the three partial streams fed to said recuperative heat exchanger for preheating therein.

6. The apparatus defined in claim 5 wherein the first compressor of said succession is a low-pressure compressor, the second compressor of said succession is provided as an intermediate-pressure compressor and said last compressor is a high-pressure compressor, the total gas being passed in succession through said low-pressure compressor, one of said coolers serving as an intervening cooler, said intermediate-pressure compressor, another one of said coolers and said high-pressure compressor.

7. The apparatus defined in claim 6 wherein peripherally around the axis of said reactor there are provided:
the turbine set of said high-pressure compressor;
a further one of said coolers serving as a precooler and traversed by the total gas prior to its entry into the low-pressure compressor;
one of said recuperative heat exchangers;
the turbine set with the low-pressure compressor;
one of said intervening coolers;
a further one of said recuperative heat exchangers;
the turbine with said intermediate-pressure compressor;
the other of said intervening coolers; and
the third of said recuperative heat exchangers.

8. The apparatus defined in claim 6 wherein another of said cooler units forms a precooler, said recuperative heat exchangers being formed in respective compartments of said housing and having gas spaces communicating with a gas space formed above said precooler, said units being distributed peripherally at said housing around the axis of said reactor in the following order:
said turbine set with said high-pressure compressor;
said precooler;
one of said recuperative heat exchangers;
the turbine set with said low-pressure compressor;
a first of said intervening coolers;
a second of said intervening coolers;
the turbine set with said intermediate-pressure compressor; and
the remaining two recuperative heat exchangers.

9. The apparatus defined in claim 6 wherein each of said recuperative heat exchangers is formed in said housing in a respective compartment, a respective precooler being disposed in each of said compartment below the respective recuperative heat exchangers.

10. The apparatus defined in claim 6 wherein said turbine sets and said recuperative heat exchangers are distributed around the axis of said reactor in the following order:
the turbine set with the high-pressure compressor;
two of the recuperative heat exchangers;
the turbine set with the low-pressure compressor;
one of said intervening coolers;
the third recuperative heat exchanger;
the turbine set with the intermediate-pressure compressor; and
another of said intervening coolers.

11. The apparatus defined in claim 5 wherein two of said compressors are formed as low-pressure compressors, the other compressor being a high-pressure compressor, the gases from said low-pressure compressor being passed in a total stream through said one of said intervening coolers and said high-pressure compresor.

12. The apparatus defined in claim 11 wherein only the turbine sets with the low-pressure compressors drive respective generators.

13. The apparatus defined in claim 11 wherein said units and said turbine sets are distributed peripherally around the axis of said reactor in the following order:
the turbine set with the high-pressure compressor;
said intervening cooler;
one of said recuperative heat exchangers;
one of the turbine sets with a low-pressure compressor;
another of said coolers serving as a precooler;
another of said recuperative heat exchangers;
the remaining turbine set with its low-pressure compressor;
another of said coolers serving as a precooler; and
the remaining two recuperative heat exchangers.

14. The apparatus defined in claim 11 wherein said housing is formed with recesses receiving at least two of said recuperative heat exchangers and respective ones of said coolers therebelow.

15. The apparatus defined in claim 5 wherein each of said coolers is formed with a pair of parallel-connected cooler units formed one below another in respective compartments of said housing, the gas outlet of one of the units of each compartment lying opposite the gas inlet side of the other unit thereof.

16. The apparatus defined in claim 5 wherein the last of said compressors is a high-pressure compressor and is provided with at least one riser extending directly vertically upwardly and gas lines extending horizontally to the other compressors and thereafter vertically upwardly.

17. The apparatus defined in claim 5 wherein at least one of said turbine sets has between a turbine inlet and a compressor outlet a labyrinth seal.

18. The apparatus defined in claim 5 wherein at least one of said turbine sets has a compartment surrounding the turbine inlet and communicating with a high-pressure outlet of said last compressor.

19. The apparatus defined in claim 5, further comprising valve bypass lines connecting said duct means for feeding compressed gas to lines under low gas pressure.

20. The apparatus defined in claim 5 wherein said last compressor is a high-pressure compressor, further comprising a gas-storage tank bridging across the inlet and outlet of said high-pressure compressor.

* * * * *